United States Patent
Robinson

(10) Patent No.: US 9,691,205 B2
(45) Date of Patent: *Jun. 27, 2017

(54) CLOUD CONTROLLED COMMON ACCESS ENTRY POINT LOCKING SYSTEM AND METHOD

(71) Applicant: Shane Wesley Robinson, Fresno, CA (US)

(72) Inventor: Shane Wesley Robinson, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/277,964

(22) Filed: Sep. 27, 2016

(65) Prior Publication Data

US 2017/0018130 A1   Jan. 19, 2017

Related U.S. Application Data

(63) Continuation-in-part of application No. 14/707,941, filed on May 8, 2015, now Pat. No. 9,478,084.

(51) Int. Cl.
*G07C 9/00* (2006.01)
*G06F 17/30* (2006.01)
(Continued)

(52) U.S. Cl.
CPC .......... *G07C 9/00166* (2013.01); *E05B 47/00* (2013.01); *G06F 17/30979* (2013.01); *G07C 9/00111* (2013.01); *G07C 9/00309* (2013.01); *G07C 9/00571* (2013.01); *G07C 9/00904* (2013.01); *H04L 63/107* (2013.01); *G07C 9/00182* (2013.01); *G07C 2209/63* (2013.01)

(58) Field of Classification Search
CPC ............ G07C 9/00111; G07C 9/00309; G07C 9/00571; G07C 9/00182; G07C 9/00103; G07C 9/00039; G07C 9/00944; G07C 11/002; G07C 9/00166; G07C 9/00904; E05C 1/004; E05B 47/026; E05B 47/0012; E05B 39/04; E05B 45/06; E05B 47/00; H04W 12/06; H04L 67/10; H04L 63/107; G08C 23/02; G06F 17/30979
USPC ........................................ 340/5.61, 5.73, 5.5
See application file for complete search history.

(56) References Cited

U.S. PATENT DOCUMENTS 9,241,270 B1 * 1/2016 Logue .................. H04W 12/06
9,322,194 B2 * 4/2016 Cheng .................. E05B 47/026
(Continued)

*Primary Examiner* — Ali Neyzari
(74) *Attorney, Agent, or Firm* — Marin Patents LP; Gustavo Marin

(57) ABSTRACT

A cloud-based locking system and method, comprising a network-connected server comprising at least a memory and a processor and further comprising programmable instructions stored in the memory and operating on the processor, the instructions adapted to a system for locking and unlocking a common access entry point comprising, at least, a lock control interface, a relay, and a communication manager, is disclosed. The lock control interface is operably connected to a relay wherein the relay is electrically connected to a locking system of a common access entry point and able to lock and unlock a locking device thereon. The communication manager is configured to receive a request to lock or unlock the locking device from a network wherein the communication manager is operably connected to the lock control interface to issue commands to the lock control interface based on the request.

7 Claims, 12 Drawing Sheets

(51) Int. Cl.
*E05B 47/00* (2006.01)
*H04L 29/06* (2006.01)

(56) References Cited

U.S. PATENT DOCUMENTS

| | | | |
|---|---|---|---|
| 9,478,084 B1* | 10/2016 | Robinson | G07C 9/00111 |
| 2011/0289123 A1* | 11/2011 | Denison | G07F 11/002 |
| | | | 707/812 |
| 2015/0007619 A1* | 1/2015 | Finney | B62J 11/00 |
| | | | 70/58 |
| 2015/0102906 A1* | 4/2015 | Gerhardt | G07C 9/00309 |
| | | | 340/5.61 |
| 2015/0221147 A1* | 8/2015 | Daniel-Wayman | G07C 9/00103 |
| | | | 340/5.54 |
| 2016/0189503 A1* | 6/2016 | Johnson | E05B 55/12 |
| | | | 348/152 |
| 2016/0307380 A1* | 10/2016 | Ho | G07C 9/00079 |
| 2016/0319571 A1* | 11/2016 | Johnson | E05B 47/0012 |

* cited by examiner

CLOUD CONTROLLED COMMON ACCESS ENTRY POINT LOCKING SYSTEM AND METHOD

CROSS-REFERENCE TO RELATED APPLICATIONS

This application is a continuation-in-part of U.S. patent application Ser. No. 14/707,941, titled "SYSTEM AND METHOD FOR CLOUD CONTROLLED COMMON ACCESS ENTRY POINT LOCKING SYSTEM", which was filed on May 8, 2015, the specification of which is hereby incorporated by reference in its entirety.

BACKGROUND OF THE INVENTION

Field of the Art

The disclosure relates to the field of locking systems, and more particularly to the field of common access entry point locking systems.

Discussion of the State of the Art

It is common practice in an apartment complex or other establishments with common access entry points to require an individual seeking admission to identify himself by speaking to the tenant over a communication system. These systems are often outdated and tedious to navigate.

A conventional access control system for a building or an apartment complex that has a normally-latched common entrance door typically has at least one main entrance unit (for example at a community front door or a roadway gate), for selectively signaling a plurality of hard-wired residential access control stations installed inside of a plurality of residences operated by tenants to communicate with the tenants to request and grant access. In some systems a tenant directory is installed at the common entrance for selecting the desired tenant. These systems are costly to install, not easily maintained, and typically require a specialized resource to update the directory. Since multi-housing units are run by maximizing profit, other priorities take precedence before upgrading to entry mechanism. Often, directories do not get timely updated and provide for an undesirable user experience (for example, not finding a tenant by their name since their name was never updated).

In other buildings, the apartment building intercom and door release arrangement is integrated with a regular central office telephone system so that the tenant can communicate with the visitor from the telephone in his apartment typically over a landline where the tenant may control the entrance access to the common entrance door by the generating a DTMF digit via the telephone keypad. Though a telephone-based system is a step forward, cheaper to implement, and more convenient than a hard-wired system, challenges exist when a visitor arrives in certain circumstances. For example, while the tenant is on a regular phone call or the phone itself is unavailable because it is lost or does not have sufficient battery power.

What is needed is a centrally controlled system that allows to quickly and efficiently control common access entry points such as common access doors and gates that is user friendly and leverages more modern communication methods and habits. Further, an entry system that can potentially provide a revenue stream, may further increase adoption.

SUMMARY OF THE INVENTION

Accordingly, the inventor has conceived and reduced to practice, in a preferred embodiment of the invention, a cloud-based common access entry point locking control system and method.

According to a preferred embodiment of the invention, a common access entry point lock management system (for example, a front door to multi-unit housing, a gate, or any access-controlled entrance where a plurality of people that require access, must use), comprising a network-connected server with at least a memory and a processor and further comprising programmable instructions stored in the memory and operating on the processor, the instructions adapted to a system for common access entry point lock management, comprises a configuration database, a host configuration manager, a guest request manager, a location manager, a security manager, and a communications manager. One or more locking devices are configured via the host configuration manager and stored in the configuration database. In some embodiments, the host configuration manager is configured to determine that a mobile device, (for example, a smartphone, a tablet device, a wearable electronic device, a key fob, an in-vehicle communication device, etc.) has been configured to allow access to a particular common access entry point. The guest request manager may be configured to receive access requests from mobile devices in order to lock and unlock one or more common access entry point locking devices. The location manager is configured to periodically receive global position information from mobile devices configured in the system. In some embodiments, the location manager is configured to receive an alert that a mobile device is within a predefined proximity of a common access entry point and may take action on the event, for example, to automatically unlock the common access entry point. The security manager is configured to store one or more identifiers corresponding to mobile devices and the associated locking devices to which they have access. The communication manager may receive communication from the plurality of mobile devices, for example, an audio of video communication. In some embodiments, the security manager is configured to receive an unlock request from a configured mobile device to unlock a particular common access entry point, the security manager then sends an unlock request to a premise-based lock manager connected to the common access entry point. In another embodiment, the security manager is configured to receive an unlock request from a mobile device to lock or unlock a common access entry point. In another embodiment, the security manager may be used to query the state of the lock, that is, whether or not the common access entry point is locked. The security manager may be configured to send an unlock event to a premise-based lock manager connected to the common access entry point.

In a preferred embodiment, the communication manager is configured to send an unlock event automatically to a premise-based lock manager of a common access entry point when the mobile device is in a pre-configured physical proximity to the common access entry point.

In a preferred embodiment, a locking device management system, comprises a lock control interface, a communication manager, and a lock control manager. The lock control interface is connected to a lock of a common access entry point and able to lock and unlock a locking mechanism by a receiving a lock or unlock request from the cloud or from a mobile device in proximity via a short-range wireless interconnected arrangement (for example via Bluetooth™, iBeacon™, radio frequency (RF), near-field communication (NFC), etc.). The lock control manager is configured with a plurality of identifiers that are able to trigger an unlock event wherein the unlock event causes the locking mechanism to unlock. In another embodiment, the lock control manager is configured to accept an alphanumeric code to trigger a lock or unlock event. For example, in an arrangement where a mobile device requests access to a common access entry point, and the mobile device does not have an appropriate client mobile application installed, the common access entry point lock management system may send a code to the mobile device, for example, via short message service (SMS) or email wherein the user of the mobile device may then, for example, type the code on a keypad or, in another embodiment, the code may be transmitted to a lock management system electronically.

In a preferred embodiment, a mobile client application comprising a network-connected mobile device, a location manager, a communication client, a user interface, a user profile, and a key manager, is disclosed. The location manager is configured to maintain a current global position of the mobile device. The location information is then transmitted to a common access entry point locking management system. The communication client is configured to communicate with a plurality of subscribers configured in the common access entry point lock management system configuration database. The user interface is configured to receive access requests form a user, for example to announce an arrival at a location, or, in another embodiment, to request a tenant directory, or some other information to assist in accessing a common access entry point. The user profile is configured to store at least access information to the common access entry point lock management system, user identification, user preferences, and other profile information. The key manager is configured to store the identification and location of a one or more a locking device management system to which the user can request access. In some embodiments, the user profile may be configured to automatically request access to the common access entry point locking management system when the location manager determines that it is within a predefined physical proximity to a locking device management system, for example, with no user intervention. In this regard, an unlock event may happen automatically form the cloud, or from direct connection from a connected device (for example, Bluetooth™, iBeacon™, etc.)

It should be appreciated that a wide variety of specific implementations may be possible according to the invention. It should also be appreciated that a common access entry point locking management system, premise locking devices, and mobile client application may be operated independently of each other as dedicated systems.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

access entry point using a mobile application.

Figure 11:
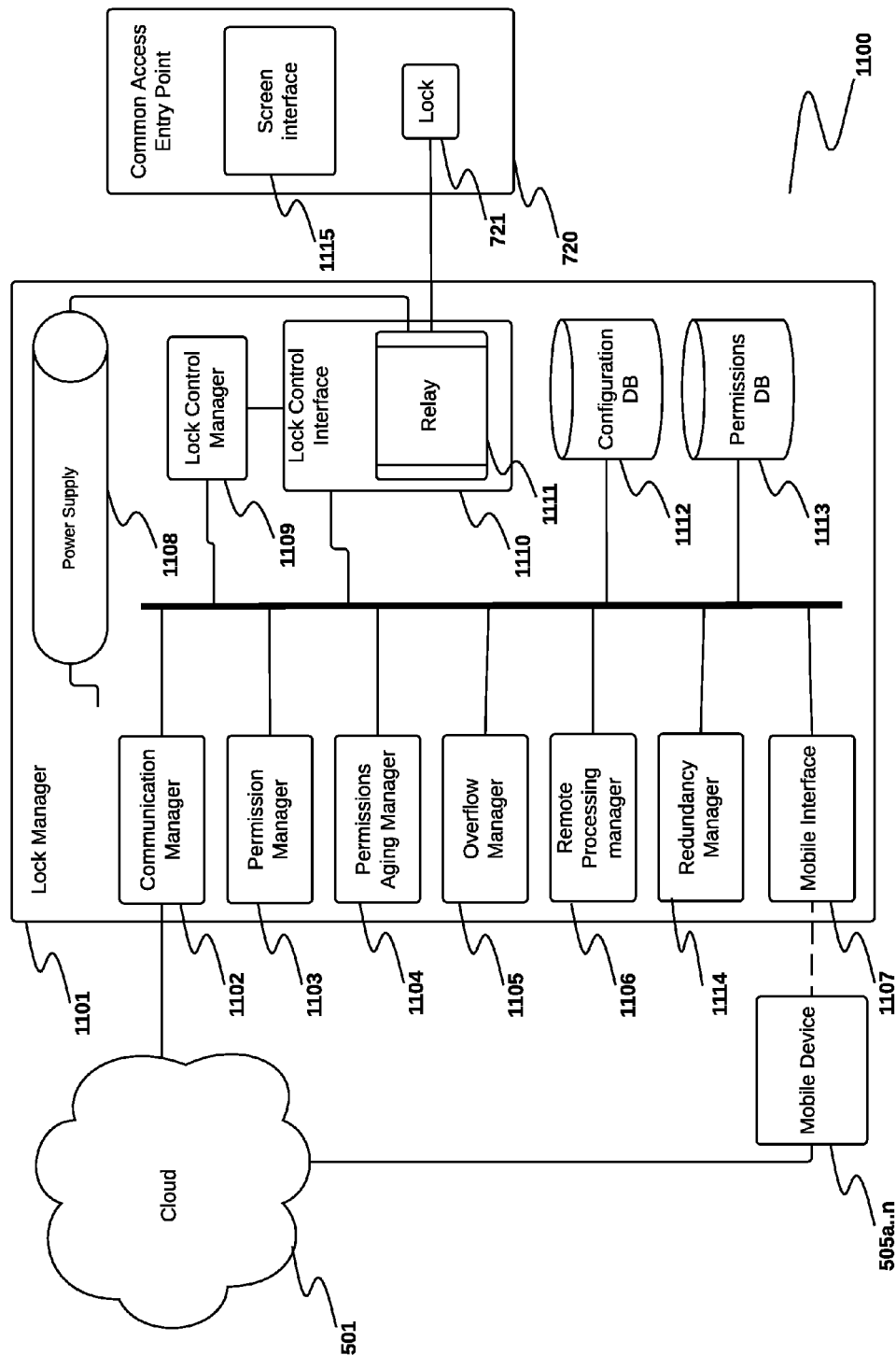

FIG. 11 is a block diagram illustrating an enhanced embodiment of a premise-based cloud controlled lock management system, according to an embodiment of the invention.

Figure 12:
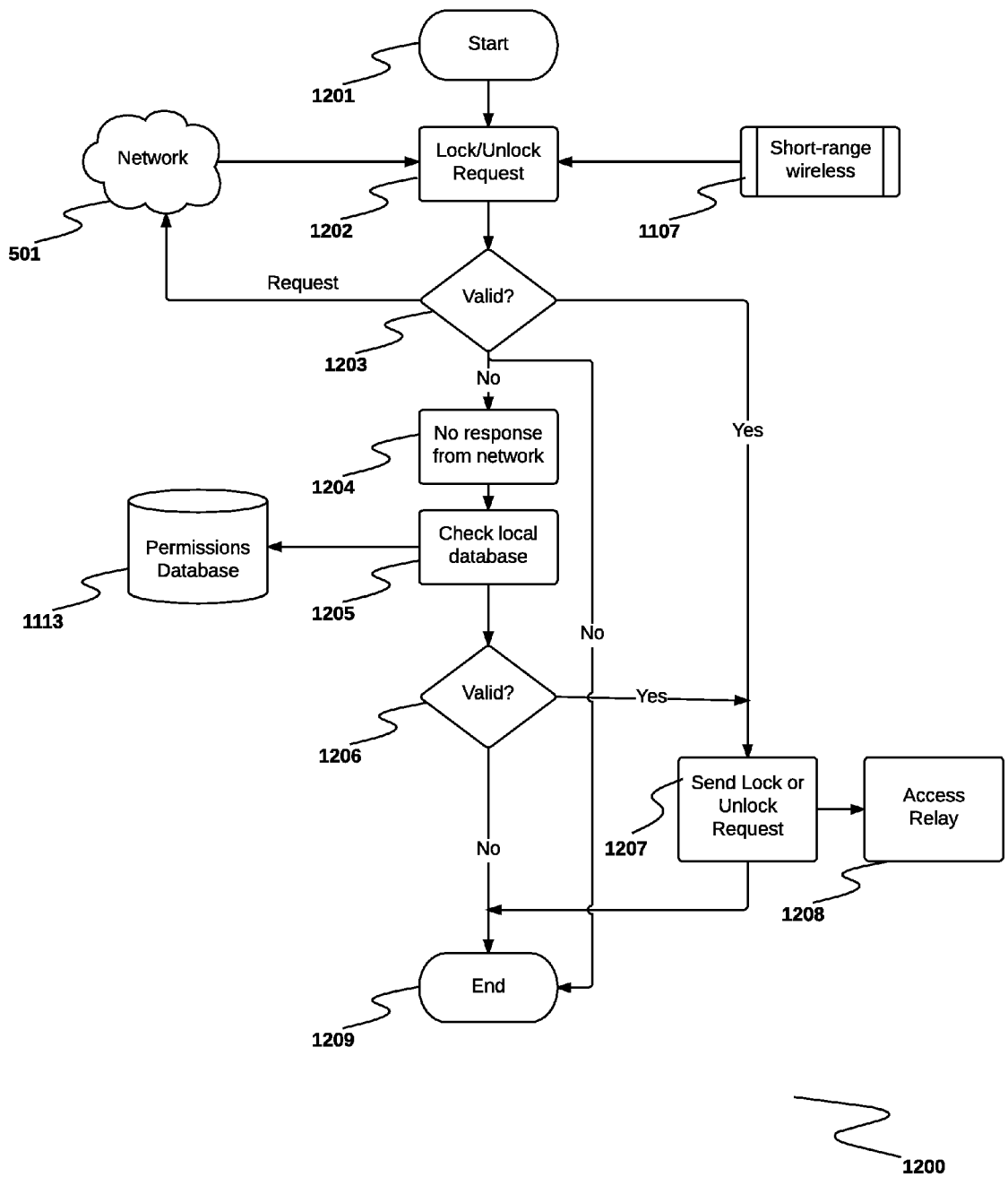

FIG. 12 is a flow diagram illustrating an exemplary method for authorizing access to a common access entry point, according to an embodiment of the invention.

DETAILED DESCRIPTION

The inventor has conceived, and reduced to practice, in a preferred embodiment of the invention, a cloud-based common access entry point locking control system and method.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

GLOSSARY OF TERMS

As used herein the following terms have the meaning given below:

"Unlock event": a signal (for example, a data packet) from a system process (for example, communications manager 612) sent to a device (for example, lock manager 710) to indicate that a lock (for example, lock 721) should be unlocked.

"Lock event": a signal (for example, a data packet) from a system process (for example, communications manager 612) sent to a device (for example, lock manager 710) to indicate that a lock (for example, lock 721) should be locked.

"Common Access Entry Point": an entry point where multiple people who may be unrelated, require access. For example, the front entrance to multi-unit housing (for example, an apartment building, college dorm building, etc.), commercial establishments (for example, an office building, a retail establishment, a sporting facility, etc.), a roadway or property gate (for example, in a gated residential community, at a commercial construction site, at a parking lot, etc.)

"Automatic proximity access": an arrangement where access is granted to common access entry point 720 to a requester when the requestor is within a pre-configured proximity of common access entry point 720.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, wearable device, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
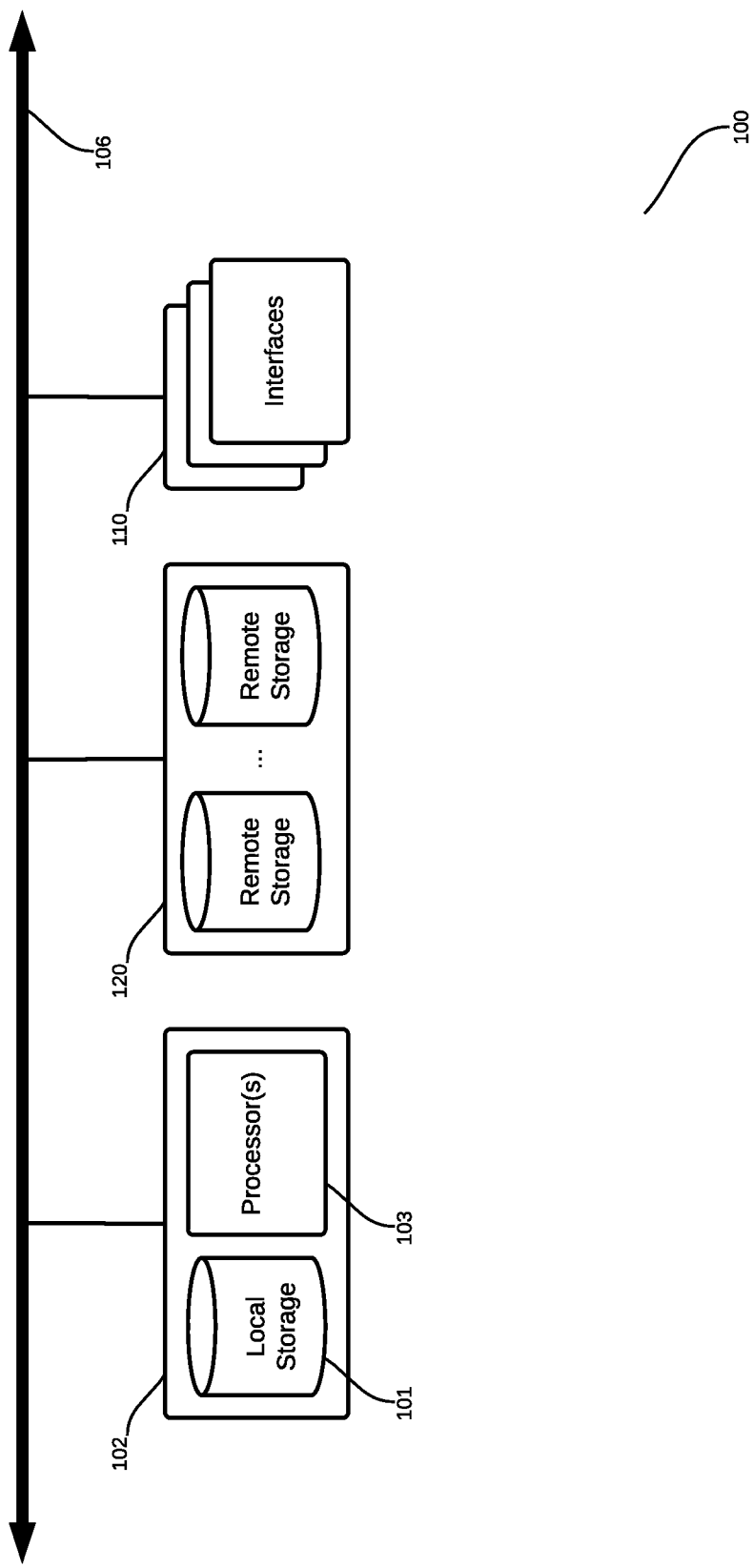
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
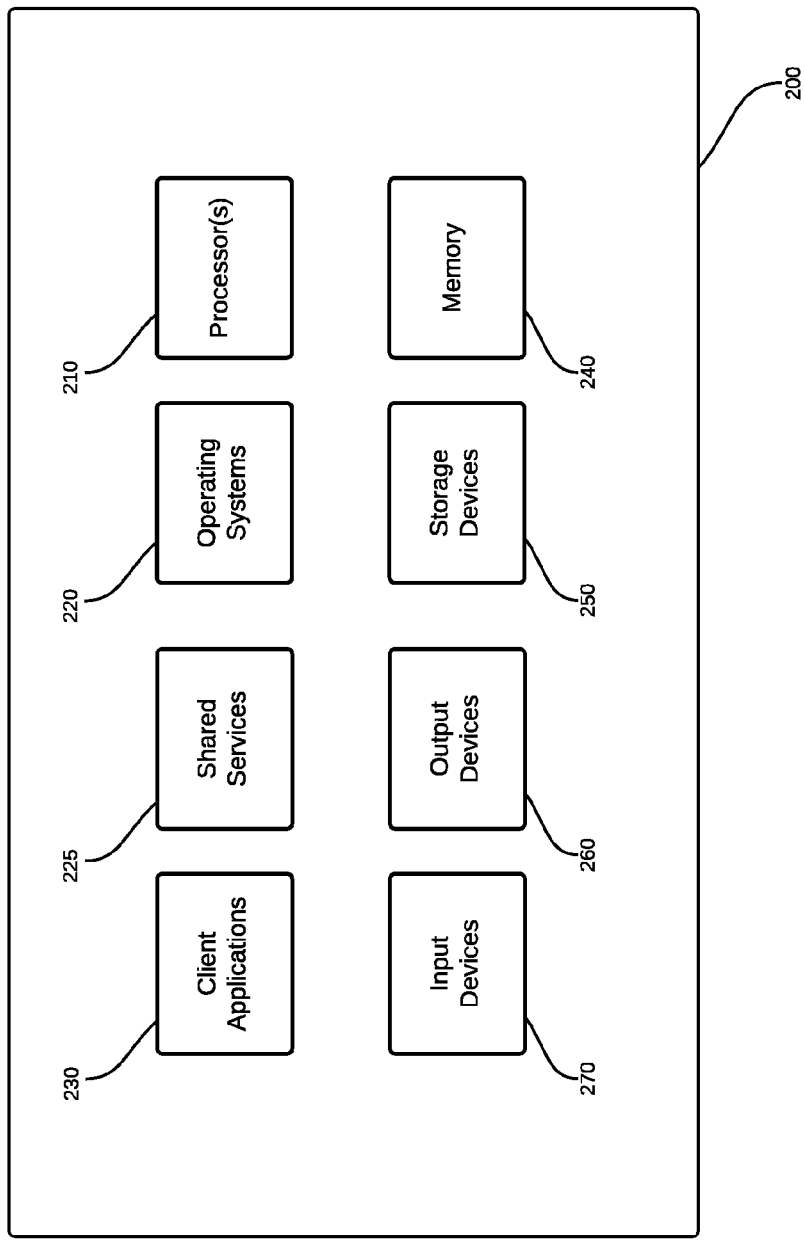
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
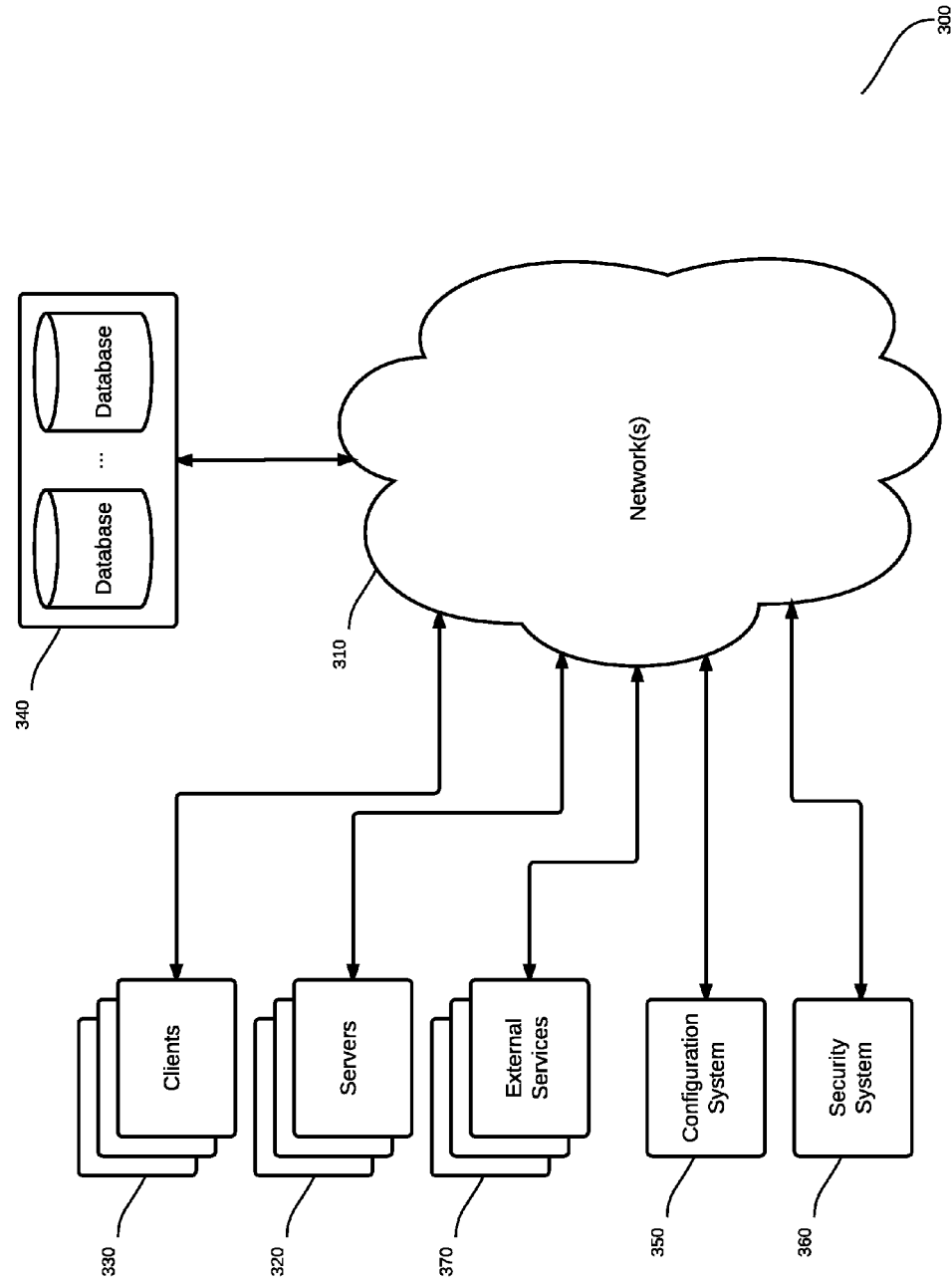
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
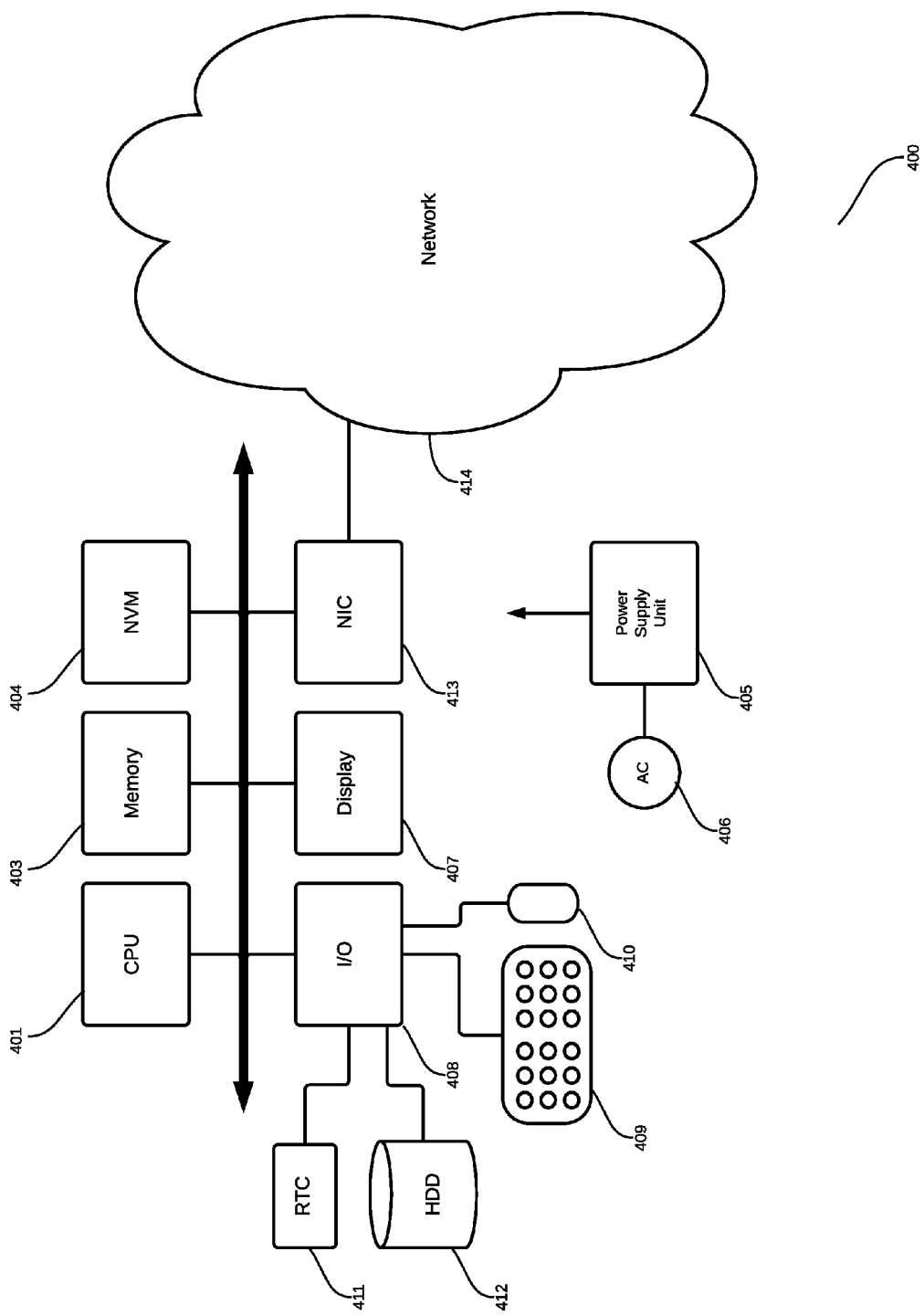
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
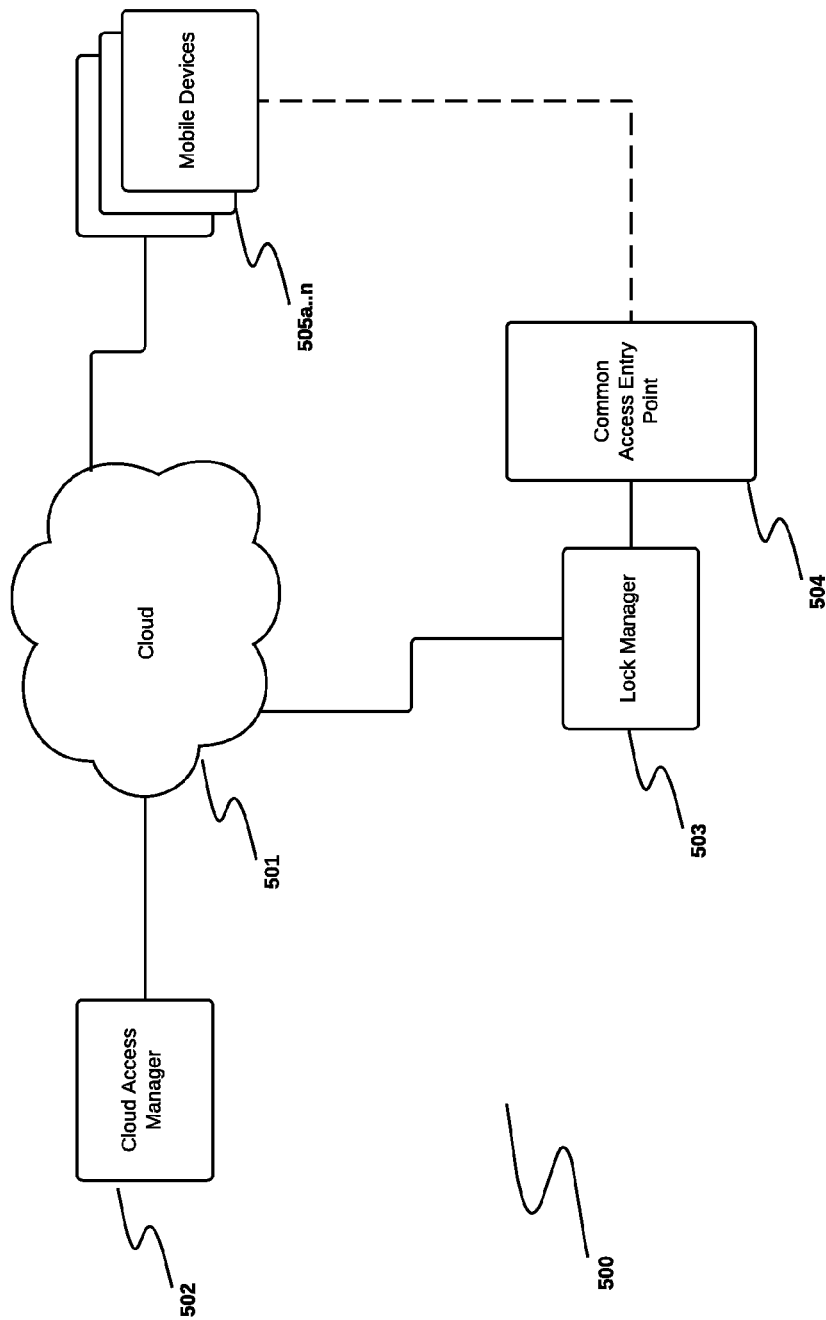
FIG. 5 is a block diagram illustrating an exemplary system architecture for operating a cloud controlled common access entry point lock system, according to a preferred embodiment of the invention.

FIG. 5 is a block diagram illustrating an exemplary system architecture 500 for operating a cloud controlled common access entry point locking system, according to a preferred embodiment of the invention. According to the embodiment, a cloud access manager 502 may operate a cloud controlled access point locking system through communication via a network 501 such as the Internet or any suitable communication network (hereinafter referred to as "the cloud"). A common access entry point 504 may operate a premise-based lock manager 503 that may communicate via a network 501 to interact with a cloud access manager 502, generally to send and receive lock instructions such as "unlock this entry point", for example. User devices 505a-n may interact with a common access entry point 504 or directly via the cloud 501 with a cloud access manager 502 according to a desired use case or operation. User devices 505a-n may be any of a variety of network-connected computing devices, such as (for example) a smartphone, laptop or tablet personal computer, or a desktop workstation.

During operation, a user device 505a-n may be used to configure system 500, such as by configuring the operation or stored information of a cloud access manager 502. Other user devices 505a-n may be used to interact with system 500, generally to gain access according to its operation. For example, a user with a smartphone may interact with a common access entry point (such as a webpage interface or a mobile software application operating on their smartphone) to request entry. If a corresponding access rule is found by a cloud access manager 502, entry may be granted and a premise-based lock manager 503 may then unlock the entry point (such as a door or gate), allowing the user to enter. It should be appreciated that a user device 505a-n may be any network-connected electronic device, including (but not limited to) a smartphone, tablet or laptop personal computing device, desktop computer, or wearable electronic device such as a "smart watch" (for example, MICROSOFT BAND™ or APPLE WATCH™).

In this manner it may be appreciated that a cloud-based access system according to the embodiment offers greater functionality than other "smart lock" devices in the art. Such devices generally focus on a single entry point and user, optionally allowing that user to configure guest access or grant entry to other users but generally requiring significant manual operation for such uses. Focus is placed on their use as a replacement or supplement to a single residential door lock, and there is no means to adapt them to a community arrangement for operating a gate or entryway to service multiple users or administration by a landlord. Using a cloud-based system according to the embodiment gives a landlord and system administrator the ability to easily and quickly configure a system for operation and setup access for tenants or guests, and individual users may then grant and gain access independently.

Figure 6:
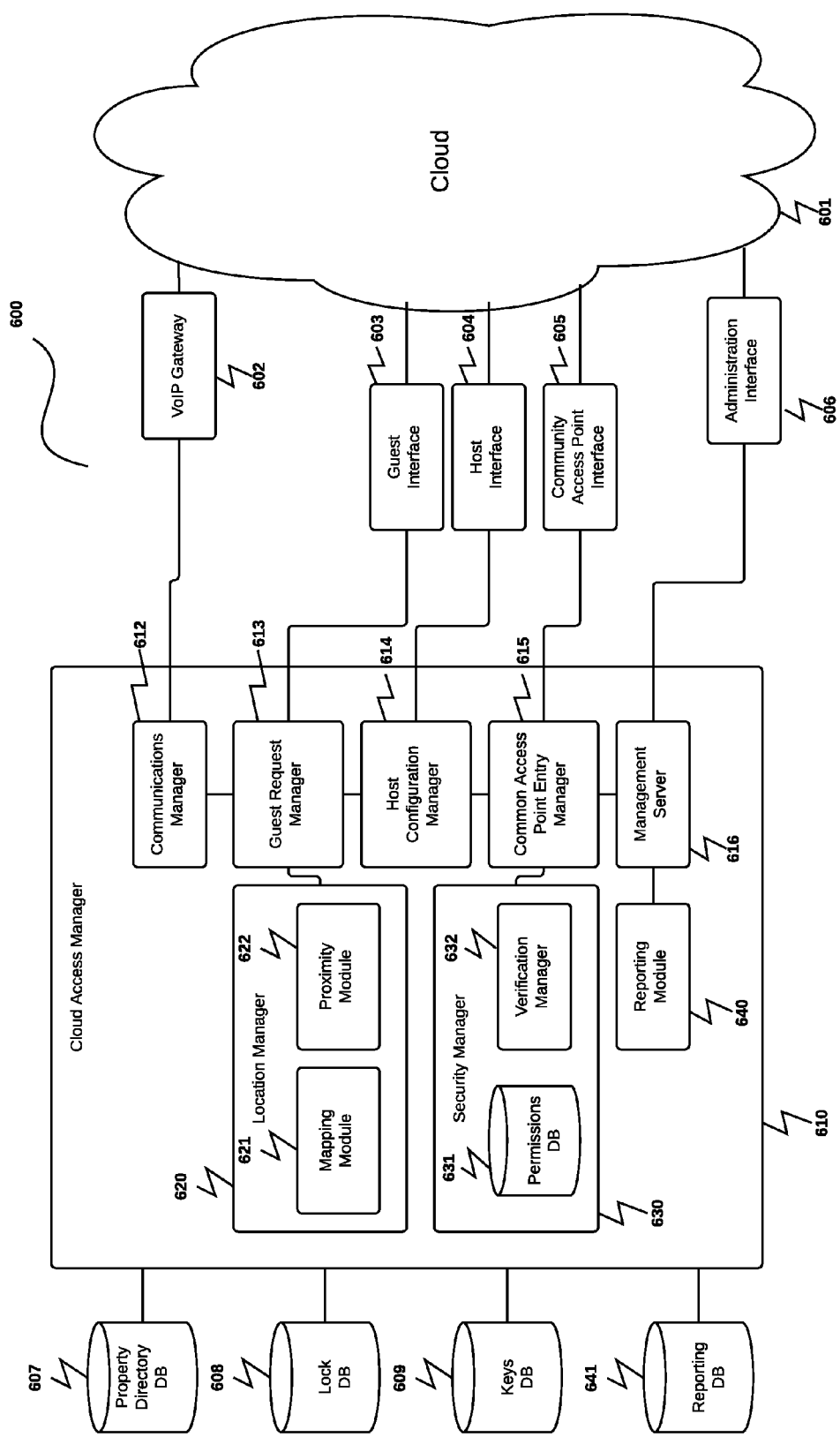
FIG. 6 is a block diagram illustrating a more detailed view of a cloud access manager for use in operating a cloud controlled common access entry point lock system, according to an embodiment of the invention.

FIG. 6 is a block diagram illustrating a more detailed view of a cloud access manager system 600 for use in operating a cloud controlled common access entry point lock system, according to an embodiment of the invention. According to the embodiment, a cloud access manager 610 may operate a plurality of software applications or interfaces, such as a location manager 620 that may monitor user location or proximity, a security manager 630 that may authenticate users, a communications manager 612 that may communicate via a network 601 or via external interfaces such as a voice over internet protocol (VoIP) gateway 602, a guest request manager 613 that may communicate via a guest interface 603 to send and receive communication for guest users (such as users that need temporary or one-time access, for example, a courier, service provider, or houseguest), a host configuration manager 614 that may communicate via a host interface 604 to send and receive communication for host users (such as residents in a community), a common access entry point manager 615 that may operate a common access entry point interface 605 to send and receive access requests (such as instructions to a lock system to lock or unlock), and a management server 616 that may communicate via an administration interface 606 to receive interaction from an administrative user (such as to configure operation, create/modify access rules for users, manage the system, create reports, etc.). A plurality of data storage may also be utilized, such as a property directory database 607 that may store and provide information on known users or locations within a community (such as tenants and their apartment numbers, for example), a lock database 608 that may store and provide information for individual lock mechanisms or entry points, or a keys database 609 that may store and provide information for specific keys or access passes. In some embodiment, access passes may be limited by date and time, or time range, by code, or the like.

A location manager 620 may operate a mapping module 621 that may be used to maintain map-based information for an area around or within a community, such as to maintain a map model for apartment units, parking spaces, maintenance access routes, specific entry points, or any other such mapping data that may be relevant to a community or to a manager or tenant thereof. Location manager 620 may also operate a proximity module 622 that may monitor user locations (such as through the use BLUETOOTH™, cellular or WiFi signals, geofencing or GPS pinpointing, or any combination of suitable location technologies), to determine when a user is near an entry point and take appropriate preemptive action. In some embodiments a predefined proximity may be set and in this regard, alerts may be triggered when a user crossed the predefined proximity threshold. For example, if it is recognized that an authorized user (such as a tenant in an apartment complex) is approaching a gate or doorway that is locked, a cloud access manager 610 may instruct the entry point to unlock to allow the user to pass, so that when the user reaches the door or gate they do not need to manually unlock it or wait for the system to "catch up".

A security manager 630 may operate a permissions database 631 that may store and provide permission information for users, generally to maintain a repository of information pertaining to "who may go where", for example. Security manager 630 may also operate a verification manager 632 that may verify a particular user against the permissions database 631, to determine whether or not they are an authorized user. For example, a tenant in an apartment complex might be added to a permissions database 631 as having free access to a front gate, but limited (for example, within specific hours or only on certain days) access to a fitness room. In some embodiments, permissions database 631 may be globally or individually configured to set an expiry to devices authorized to gain access. If the tenant approaches the front gate (as may be determined by a location manager, as described above), their device or user information may be utilized by a verification manager 632 to authorize them according to the rules stored in a permissions database 631, and the gate may be unlocked. If that same user were to approach the fitness club outside normal hours, a verification operation may instead deny access, and the door will remain locked as they do not meet the set permission rules for authorization.

A communications manager 612 may be used to communicate over a network 601 with users or external software applications, such as to integrate with a community directory application or a payment system (for example, to block access to users who have not paid their rent after a certain period). A VoIP gateway 602 may be utilized as illustrated to place or receive phone calls over an IP-based network connection, such as to call a user and deliver a verification code for use in authorization. For example, if a user is authorized to open a locked entry point but experiences difficulty (for example, if there is a network outage preventing the entry point from communicating with other components of the system), they may request an unlock code to manually enter to pass, such as by typing the code into a keypad operated by the entry point as a backup for use in such instances. It should be appreciated that VoIP is described as an example of user communication, and any of a variety of communication types and protocols may be utilized simultaneously or interchangeably according to the embodiment, and new types may be added as necessary (for example, a user may opt to receive codes via a text message or email instead of a telephone call).

In a preferred embodiment, reporting manager 640 records a record of all interactions of cloud access manager system 600, to reporting DB 641, for example, registered users, granting guest access, addition and removal of keys, request from guests for directories, attempted access during restricted or unauthorized times, all keys accesses for each configured common access entry points 720, metrics on access characteristics, for example, accesses by GPS proximity, access by smart fob (that is, an RF device requesting authentication), access by short-range peer-to-peer communications (for example Bluetooth™, iBeacon™, etc.). Management server 616 allows an administrator user to log into the administration interface to view historical and real time reports on interactions within the system. Administrator interface 606 provides graphical tools to present data in a useful way to manage the system both historically and in real-time. Management server 616 may provide high availability and management of system components, for example, via small network management protocol (SNMP) or the like.

Figure 7:
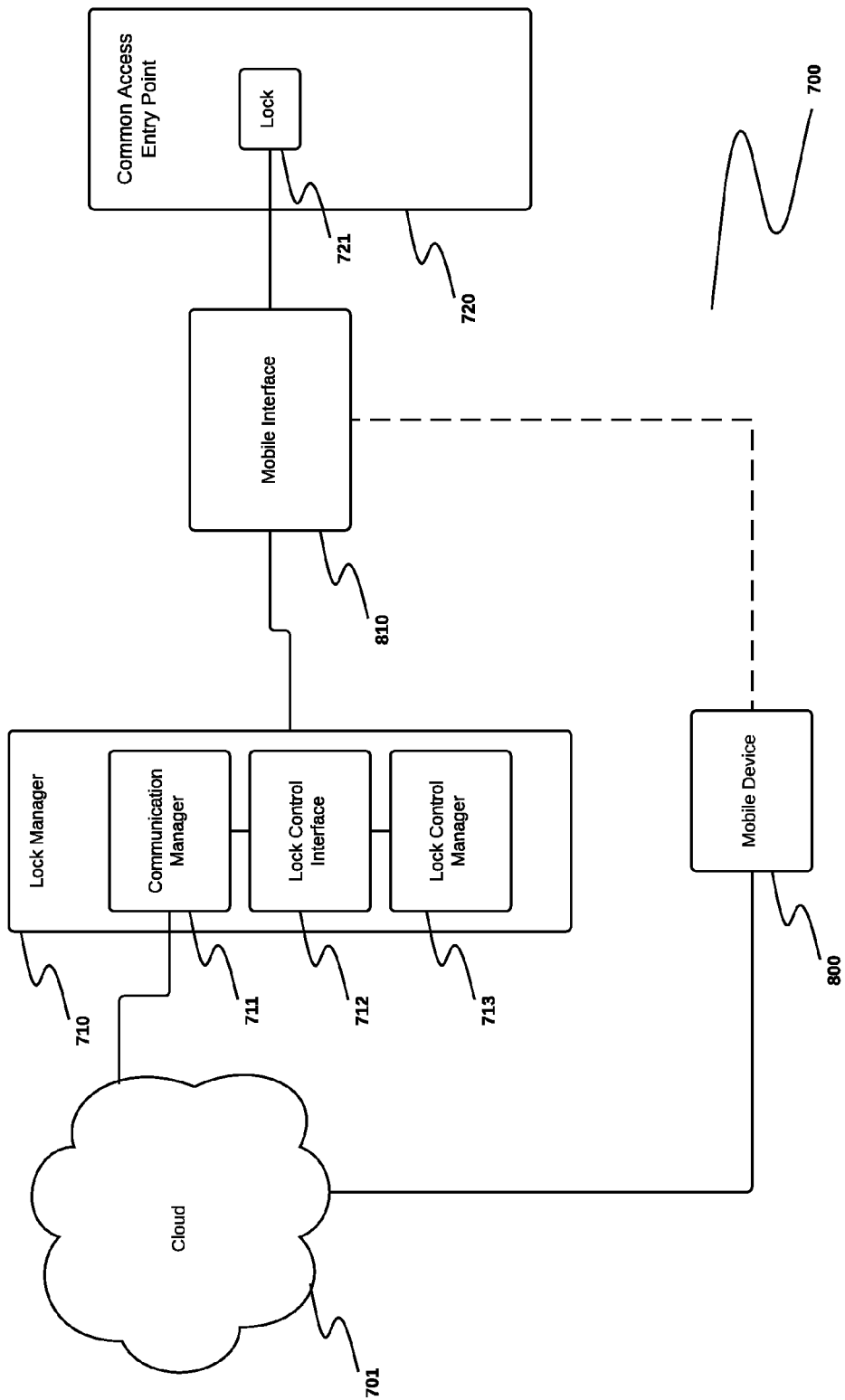
FIG. 7 is a block diagram illustrating a more detailed view of a premise-based lock manager and client operation for use in operating a cloud controlled common access entry point lock system, according to an embodiment of the invention.

FIG. 7 is a block diagram illustrating a more detailed view of premise-based lock manager 710 and client operation 700 for use in operating a cloud controlled common access entry point locking system, according to an embodiment of the invention. According to the embodiment, premise-based lock manager 710 may operate a communication manager 711 to send and receive communication via a network 701, for example a WiFi or cellular data network. Premise-based lock manager 710 may also operate a plurality of lock control interfaces 712 that may interact with locks or other access mechanisms such as motorized gates or window shutters, and premise-based lock manager 710 may also operate a lock control manager 713 that may configure and manage the operation of the plurality of lock control interfaces 712. For example, a single premise-based lock manager 710 may operate multiple motorized window shutters (such as in a retail storefront that shutters the windows after closing), each managed by a discrete lock control interface 712. This approach ensures robustness of a system 700 by incorporating redundancy in the lock controls, such that if a single lock mechanism or control interface fails, others may not be affected.

According to the embodiment, a mobile device 800 (such as a smartphone or personal computer) may operate a software-based mobile interface 810 for interacting with a premise-based lock manager 710. Mobile device 800 may also communicate via a network 701 to directly interact with premise-based lock manager 710 or other components without the use of an interface 810, for example, for background communication (such as when a user's smartphone is in their pocket, for example). In another embodiment, mobile device 800 may communicate directly with premise-based lock manager 710 via Bluetooth™, iBeacon™, RF, NFC, and the like. In another embodiment, mobile device 800 may be a key fob device to initiate an unlock request. In this regard, mobile interface 810 may sense a key fob 800 and request permission form lock manager 710. In some embodiments, communication manager 711 may further request access from cloud access manager 610 through cloud 701. Access may be granted based on permissions configured in permissions DB 631. For example, key fob 800 may be assigned to maintenance staff (for example, cleaning staff, repair staff, etc.) who are only authorized to access common access entry point 720 at particular pre-configures times of day. In this regard, lock manager 710 allows access during authorized periods and denies access during unauthorized periods. In some embodiments, a user first authenticates themselves using the key fob and enters a pre-configured personal identification number (PIN) on lock control interface 712, followed by a code displayed on lock control interface 712.

In a preferred embodiment, lock 721 is a circuit driven platform (for example, Arduino™ printed circuit board, FPGA, EEPROM, etc.) that controls a door lock via external relay module (for example, electromechanical relay (EMR), solid-state relay (SSR)). Cloud 701 may be a mobile network (for example, GSM, CDMA, and the like). In some embodiments, relay module may control an external electronic door lock via 2-channel isolated relay module. Common access entry point 720, when closed, is this regard, requires, for example, 12V/600 mA signal for state changing. To produce the external signal, a +12V AC/DC power supply may be connected to lock 721 by connecting through the relay module. In some embodiments, two relays may be normally opened. A first relay is connected to a power supply output with a coil. A second relay may drive the coil to change lock state. This 2-stage operation increases reliability and greatly minimizes the chance of fail-switching. Relay coils may transfers electrical signals between the two isolated circuits by using light via an optocouplers on relay module via a circuit connection GPIO and may provide electrical isolation and improved noise immunity for control board. To indicate a lock state, lock manager 710 may drive RGB LED circuitry in a "face plate" (not shown) via an external relay module with the same operation principle as in case of lock driver. The face plate may consists of, for example an RGB LED ribbon powered by external +12V AC/DC supply and driven by external relay module via circuitry general purpose input/output (GPIO). The RGB LED ribbon may illuminate a flat light guide panel from inside of "face plate" enclosure thus indicating lock state with different colors.

It should be appreciated that in some embodiments, locking device 721 is any access point whereby access may be controlled whether physical, electrical, or online.

Figure 8:
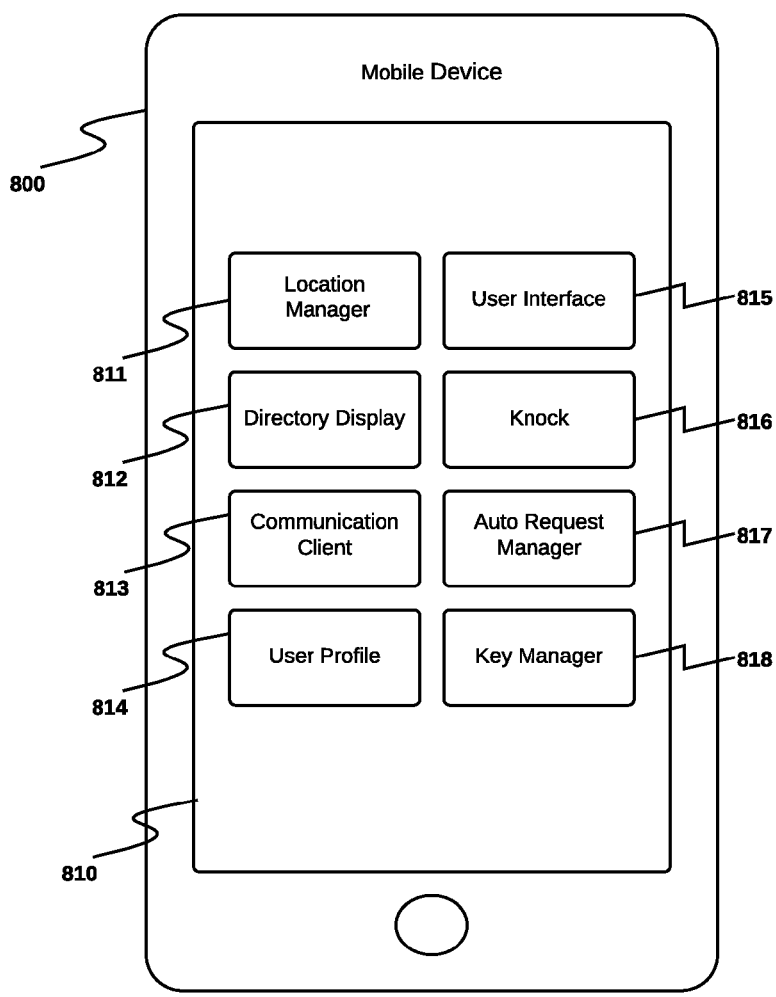
FIG. 8 is a block diagram of an exemplary interface for operating a cloud controlled common access entry point lock system, according to an embodiment of the invention.

FIG. 8 is a block diagram of an exemplary interface 810 for operating a cloud controlled common access entry point locking system, according to an embodiment of the invention. Mobile device 800 comprises a location manager 811, directory display 812, communication client 813, user profile 814, user interface 815, knock 816, auto request manager 817, and key manager 818. Location manager 811 maintains a current location of mobile device 800. In a preferred embodiment, mobile 800 transmits its global location (for example, GPS or location determined by other means such as WiFi triangulation) to location manager 620 through cloud 601 (for example, a cell network). In a preferred embodiment, directory display 812 displays a directory of tenants in, for example, an apartment building or industrial plaza. In some embodiments, tenant directories are automatically downloaded when mobile device 800 has determined that it is within physical proximity of community access point 720. In other embodiments, a directory may be manually requested through a manual request via directory display 812. Communication client 813 allows mobile device 800 to initiate a communication with a host (that is, for example, a tenant in an apartment building). Communication may be, for example, audio (for example, a VoIP conversation), video (for example, via Skype or a custom built video communication application), text (for example, email or SMS) and initiating the playback of an audio file (for example a custom recorded audio file associated with a particular guest) at a host device 505n. User profile 814 configures the user information of mobile device 800, for example, name, address, preferences, credit card information, etc. In one embodiment, common access entry point 720 may be, for example, the front door to a self-serve movie theatre where mobile device 800 automatically submits a payment to, for example, a payment service operating on cloud 701 for payment of a ticket to access the theatre to watch a movie. User interface 815 allows the user of mobile device 800 to interact with the system, for example, to invite guests by granting access to common access entry point 720, to set user preferences 814, to interact with host 505a, etc. Knock 816 may be used to imitate the playback of a prerecorded audio file on host device 505n (for example, playing a way file that sounds like a knock on a door). Auto request manager 817, may automatically request access to common access entry point 720 when a preconfigured threshold of physical proximity has been passed for common access entry point 720, for example, if mobile device 800 is within five meters of common access entry point 720, location manager 811 sends an alert to auto request manager 817 and an access request may be automatically sent to cloud 701 to initiate an unlock event. For example, an emergency vehicle such as an ambulance may have an in-vehicle communication device 800 installed that is connected to cloud 701 (for example, a public cellular network). When the emergency vehicle approaches common access entry point 720, for example, a gate in a gated community operated by system 500, auto request manager 817 may automatically send an unlock request through cloud 701 to security manager 630 without the need of manual user intervention. Security manager 630 checks permission DB 631 and determines that the ambulance has access to common access entry point 720 and automatically sends an unlock event to common access entry point 720 without manual user intervention. Key manager 818 maintains a record (i.e. a key) for each common access entry point 720 to which it may have access. For example, the user of device 800 may be a cleaning staff member. In this regard, the user may browse user interface 815 to select a preconfigured key within key manager 815 to access a particular common access entry point 720.

In some embodiments, a revenue arrangement may be made with governmental services or commercial establishments, where access can be given to common access entry point 720. For example, the operator of system 600 may provide access (for example, automatic proximity access) to a commercial establishment (for example, a retail pizza provider, a television cable provider, FedEx™, UPS™, USPS™, etc.) or governmental establishments (for example, law enforcement, counter-terrorism groups, emergency services such as medical services or hazmat teams, etc.) wherein the commercial or governmental establishment may have automatic access to a plurality of common access entry points 720 without having to request access on each service call or delivery. It can be appreciated by one with ordinary skill in the art that a commercial or governmental establishment having access to a plurality of common access entry points 720 would provide more efficient and profitable commercial services and more efficient governmental services, thus a revenue model (for example a subscription) arrangement may be made with the commercial or governmental services.

Detailed Description of Exemplary Embodiments

Figure 9:
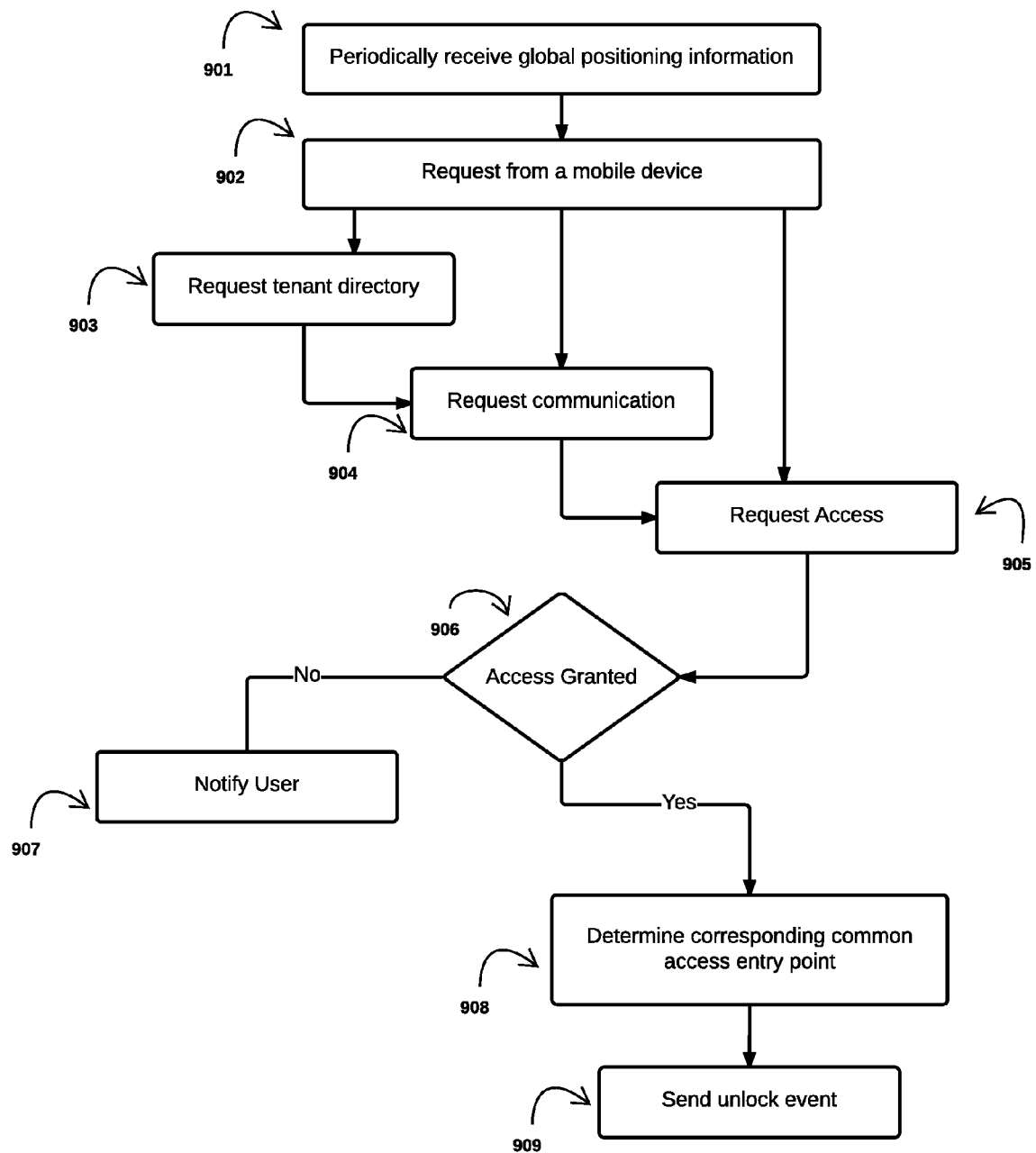
FIG. 9 is a block diagram of an exemplary method for accessing a common access entry point.

FIG. 9 is a method for accessing a common access entry point. In step 901, location manager 620 receives periodic global position information, for example GPS coordinates, triangulated position, etc., from mobile device 800, for example, a mobile phone that is preconfigured for access in permissions DB 631. In some embodiments, mobile device 800 may be a wearable electronic device, such as a smartwatch. Location manager 620 creates a record of the mobile device in mapping module 621. Proximity module 622 keeps track of mobile device 800 and its periodic proximity to premise-based lock manager 710. In step 902, a request is received from guest interface 603 requesting access, for example, to unlock, premise-based lock manager 710. In one embodiment, a request for access is sent in step 905, for example, by clicking button on user interface 815 on mobile device 800. In this regard a request for access is sent to cloud access manager 601 and appropriate actions taken. In another embodiment, mobile phone 800 sends the request directly to premise-based lock manager 710, for example, by creating a connection between mobile device 800 and premise-based lock manager 710 through Bluetooth™, iBeacon™, NFC, RF, or the like. In another embodiment, mobile device 800 may request a tenant directory in step 903, and a list of available tenants may be sent to mobile device 800. A tenant directory may be, for example, a list of names of tenants in a multi-unit housing complex, or the names of businesses in a business park. In another embodiment, mobile device 800 may request communication with host 505*a* in step 904, for example, a voice, short message service (SMS), email, video communication, or by triggering the playback of an audio file (for example, the sound of a knock) or video file. In this regard, communication may take place between mobile device 800 and a host 505*a*. In step 906, security manager 630 may determine, by accessing permissions DB 631, if mobile device 800 has permission to common access entry point 720. In one embodiment, access to common access entry point 720 by mobile device 800 may only be granted at a specific time of day, days per week, or some other preconfigured schedule of access. In another embodiment, access to common access entry point 720 by mobile device 800 may only be granted for a predefined number of times. For example, a customer of a fitness center purchases a set number of passes, access may be granted only for the number of passes purchased. In some embodiments, mobile device 800 requests access by sending a short message server message (SMS) to cloud access manager 610. If verification manager 632 determines that access is not granted, mobile device 800 is notified of the denial. If verification manager 632 determines that access is granted, mobile device 800 is notified that access is granted and in step 909, security manager sends an unlock event to cloud 601 with a destination of premise-based lock manager 710. In one embodiment, verification manager 632 sends an SMS message with a code where the user of mobile device 800 may then enter the code directly to lock control manager 713.

Figure 10:
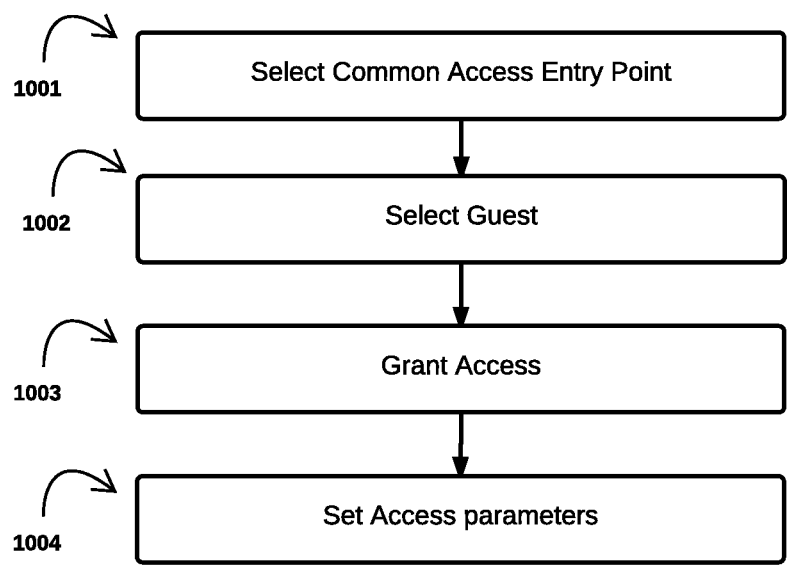
FIG. 10 is a block diagram of an exemplary method for unlocking a common access entry point using a mobile application.

FIG. 10 is a block diagram of an exemplary method for inviting a guest to access a common access entry point using a mobile application. In step 1001, host device 505*a*, for example a tenant in an apartment building, accesses an invitation screen through user interface 815 from mobile device 800. In step 1002, host device 505*a* selects a guest to invite, for example, by accessing a contact list of host device 505*a* or by entering a mobile number of a guest. In step 1003, a request is sent to guest interface 603 and the request passes to guest request manager 613. Guest request manager 613 then stores details of the guest (for example, their mobile number) in keys DB 609. If the guest has an appropriate mobile application installed, for example, the one disclosed in the instant invention, a key will be stored in key manager 818 of the guest mobile device 800. If an appropriate mobile application is not installed on guest device 800, a code may be created by security manager 630 and sent to the guest, for example, in the form of an email or SMS message. In step 1004, the host may set parameters for the guest access, for example, time of day, days of the week, etc. that access may be granted for common access entry point 720 for guest device 800.

FIG. 11 is a block diagram illustrating an enhanced embodiment of a premise-based cloud controlled lock management system, according to an embodiment of the invention. According to the embodiment, lock manager 1101 may comprise a communication manager 1102 to send and receive communication via a network 501, for example a packet-based network including, but not limited to, a WiFi or cellular data network. In some embodiments, communication manager may manage communications to and from one or more mobile device 505*a* . . . *n* through mobile interface 1107 through a short-range interconnected wireless protocol including, but not limited to near-field communication, Bluetooth™, infrared, and the like. Premise-based lock manager 1101 may also operate a plurality of lock control interfaces 1110 that may comprise relay 1111 to electrically interact with locks or other access mechanisms such as motorized gates or window shutters. It can be appreciated that, in some embodiments, relay 1111 may include an electromagnet to mechanically operate a switch on common area gateways or entrances. In other embodiments, relay 1111 may be a solid-state relay whereby circuits are powered with no moving parts, for example by using semiconductor device to perform switching. In a preferred embodiment, relay 1111 may be used to control a circuit by a separate low-power signal, or where several circuits must be controlled by one signal, for example, an electrical locking system or opening device. In other embodiments, relay 1111 may include, but not limited to, one or more latching relays, reed relays, mercury-wetted relays, mercury relays, polarized relays, machine tool relays, coaxial relays, time-delay relays, contactor, static relays, solid state contactor relay, buchholz relay, force-guided contacts relay, overload protection relay, vacuum relays, safety relays, multi-voltage relays, or any combination thereof.

In some embodiments, lock manager 710 may also operate a lock control 1109 that may be configured to manage the operation of the plurality of lock control interfaces 1110. For example, a single premise-based lock manager 710 may operate multiple motorized window shutters (such as a plurality of gates in an entrance to a community, or in a retail storefront that shutters the windows after closing), each managed by a discrete lock control interface 1110. This approach may be managed by redundancy manager 1114 to ensures robustness of a system 1100 by incorporating redundancy in the lock controls, such that if a single lock mechanism or control interface fails, others may not be affected. In some embodiments where a plurality of lock managers 1101 may be deployed, each redundancy manager 1114 may be in continuous or periodic contact with other redundancy managers 1114 (of other lock managers 1101) to coordinate between locking functions.

In some embodiments, one or more mobile devices 505*a* . . . *n* may communicate via a network 501 to interact with lock manager 1101 or other components without the use of a mobile interface 1107, for example, for background communication (such as when a user's smartphone is in their pocket) through a short-range wireless protocol. In some embodiments, mobile interface 1107 may be used as a backup when communications manager 1102 loses connection to cloud 501. In another embodiment, one or more mobile devices 505a . . . n may communicate directly with premise-based lock manager 1101 via Bluetooth™, iBeacon™, RF, NFC, and the like, through mobile interface 1107. In another embodiment, mobile device 505a . . . n may be a key fob device to initiate an unlock request. In this regard, mobile interface 1107 may sense a key fob 505a and request permission form permission manager 1103. In this regard, permissions manager 1103, though communication manager 1102, may further request permissions from cloud access manager 610 through cloud 501. Access may be granted based on permissions configured in permissions database 631. For example, key fob 505a may be assigned to maintenance staff (for example, cleaning staff, repair staff, etc.) who are only authorized to access common access entry point 720 at particular pre-configures times of day. In this regard, lock manager 710 allows access during authorized periods and denies access during unauthorized periods. In some embodiments, a user first authenticates themselves using the key fob and enters a pre-configured personal identification number (PIN) on an associated lock control interface screen interface 1115. In some embodiments, screen 1115 provides a "will call" functionality where permissions are available and stored at the lock location and a user may interface with screen interface 1115 in lieu of using a mobile device. Screen interface 1115 may be a hardware interface made up of buttons or a touchscreen device able to communicate with lock manager 1101 though cloud 501, through mobile interface 1107 or through a direct connection.

In some embodiments, upon a connection interruption between communication manager 1102 and cloud access manager 610, communication manager may resort to validating lock and unlock requests using local resources, including, but not limited to permission manager 1103, permissions database 1113. Permission manager 1103 may manage or categorize permissions for access to common access entry point 720 in a similar way as security manage 630 discussed previously (referring to FIG. 6). In some embodiments, permissions and categories are received from keys DB 609 and security manager 630 through cloud 501/601. In this regard, when permissions are received from cloud 501, communications manager 1102 stores permissions (for example permissions associated to mobile devices as discussed earlier) in permissions DB 1113. In other embodiments the permission scheme between permissions manager 1103 and permissions DC 1113 is an offline copy of security manager 630 and can function as a backup or in place of security manager 630. In this regard a copy of permissions as it pertains the access rights may be maintained locally and can be relied upon in the event of an inability to communicate with cloud access manager 610 (for example, during a network 501 outage, an emergency situation, as a preventive measure to a hacking attempt, or the like). In this regard, permissions aging manager 1104 may modify information manager when there may have been long periods of disconnection from cloud access manager 610. For example, if guest accesses have expired, permissions aging manager will deny access to guests if their time for access has expired. In another embodiment, in the event of an emergency situation, permissions manager 1103 may revoke access to at least a portion of mobile devices 505a . . . n. For example, if mobile interface receives information from, for example, an emergency notification service, that an earthquake has taken place, permission manager 1103 may initiate a "lockdown protocol" based on rules configured in configuration DB 1112. In this regard, all guests may be denied access, but all tenants, and (for example) known family members of a tenant (as may be configured in configuration database 1112), emergency services, maintenance and repair services, safety services, etc. may retain or be give new access, a broadened access, or full access. In some embodiments, when a disconnect is realized by communication manager 1102, processing may continue using mobile interface 1107. Categories may be at least a portion of identifiers associated to mobile devices 505a . . . n whereby permissions can be assigned to multiple devices 505a . . . n across the category. For example, an "emergency services" category may be assigned to first responders and law enforcement, where in the event of an emergency, the category would be assigned complete access privilege across the "emergency services" category. Similarly, a, for example, "delivery" category may be defined as a subset of identifiers associated to mobile devices in permissions DB 1113 (and in permissions DB 631) whereby during an emergency situation, all access is denied for delivery services (or any non-essential service). It should be appreciated that more than one category may be assigned to a device and a hierarchy of categories may be arranged such that certain categories get priority over other (for example, if conflicting permissions assignments are assigned to the same device 505a, the hierarchy would define which category has priority.

In some embodiments, overflow manager 1105 may manage overflow requests from other lock managers 1101. For example, if another lock manager 1101 does not have connectivity (for example, due to faulty equipment), the other lock manage 1101 may communicate through other means (for example, through a hardwired connection, through a mobile peer-to-peer interface connection, or through some other protocol) to get directives from the functioning communications manager 1102. In this regard, remote processing manager may determine, based on pre-configurations in configuration DB 1112, what information to process for each lock manager 1101. In some embodiments, remote process manager may establish a hierarchy or lock managers 1101 to work together to ensure that all lock managers 1101 have the most current configuration, permissions, etc.

In another embodiment, lock 721 is a circuit driven platform (for example, Arduino™ printed circuit board, FPGA, EEPROM, etc.) that controls a door lock via external relay module (for example, electromechanical relay (EMR), solid-state relay (SSR)). Cloud 701 may be a mobile network (for example, GSM, CDMA, and the like). In some embodiments, a relay module may control an external electronic lock 721 via a 1 or 2-channel isolated relay module. Common access entry point 720, when locked, in this regard, requires, for example, a 12V/600 mA signal for state changing. To produce the external signal, a +12V AC/DC power supply may be supplied and connected to lock 721 by connecting through relay module 1111. Relay 1111 may switch power to the actual door lock 721 on and off, allowing a door lock latching mechanism to be energized or de-energized, causing the door that the lock controls to open. In some embodiment, two relays may be activated, independently or in tandem, to send power to door lock 721 to unlock it. This 2 relay operational redundancy increases reliability and greatly minimizes the chance of fail-switching or loss of door control through individual relay failure. In another embodiment, one or two relays may be used to send a trigger signal to an existing external relay (that is, external to lock manager 1101). To indicate a lock state (locked/unlocked/in communication/control failure), lock manager 710 may drive RGB LED circuitry that changes to the color that represents the current lock state, in a screen interface 1115. It should be appreciated that screen interface 1115 may be a collection of LED indicators, a liquid crystal display, a touchscreen interface (for example an operably connected tablet device) via either an electronic signal from a PCB within the lock 720, from within a complimentary hardware arrangement, or from an external relay module with the same operational principle as in the case of the door lock driver. Screen interface 1115 may consist of, for example, an RGB LED ribbon, LED PCB or single RGB LED powered by, for example, the lock 720 power supply or an external power supply, and driven by, for example, the lock 720, or screen interface 1115 circuit driven platform, or by an external relay module via general purpose input/output (GPIO) circuitry. The RGB LED may illuminate a flat light panel or other visual indicator from inside of lock 720, screen interface 1115 (or within a complimentary hardware arrangement), thus indicating lock state with different colors. To indicate a lock or unlock state, lock manager 1109 may drive a door state grid to keep track of a plurality of common access entry point 720. That is, an oversight of entire property to, for example, gives administration interface 606 a centralized real-time oversight over the current state (opened or closed) of all secured portals of one or more properties. In this regard, a "door ajar" alarm may be implement to maintain security whereby the door state function may provide data on, at least, how long a entry has been open, the time it was left open, what users may have been in proximity, or who may have passed through the entry (and may be responsible for its state) and sends a preconfigure alert to administration interface 606 or to a mobile device 505c associated to a manager that, for example, a particular door on the property has been ajar for longer than a preconfigured threshold.

FIG. 12 is a flow diagram illustrating an exemplary method for authorizing access to a common access entry point, according to an embodiment of the invention. According to the embodiment, a cloud-based locking method 1200 is disclosed comprising a network-connected server comprising at least a memory and a processor and further comprising programmable instructions stored in the memory and operating on the processor, the instructions adapted to a system for locking and unlocking a common access entry point 720 comprising the following steps. In a first step 1201, the method starts by a receiving a request at a communication manager 1102, in step 1202, requesting access to a common access entry point, that is, a request to lock or unlock a locking device attached to the common access entry point. The request associated to an identifier whereby the identifier identifies a mobile device belonging to, for example a resident of a multi-unit housing arrangement. In some embodiments, an alphanumeric code will be associated to the request (for example, to provide security for or obfuscation of the permitted devices). In some embodiments the request arrives from communications manager 612 on cloud access manager 610. In other embodiments, the request may arrive from mobile interface 1107 comprising a short-range wireless communication from a communications-enabled mobile device. The short-range wireless request may include, but not limited to, a radio frequency transmission, near field communication, a Bluetooth transmission, an iBeacon™ transmission, or the like. In a next step, 1203 communication manager 1102 determines if the request is valid, that is, if an associated identifier (and hence, an associated mobile device) has permission to access the common area entry point 720 by sending a request to common access entry point manager 615 through network 501. If access is granted (i.e. the request is valid), an unlock request is sent by lock control interface 1110 to relay 1111 to lock or unlock common access entry point 720 (the locking action based on the request). If the request is denied the process ends at step 1209. If a preconfigured timeout occurs from network 501 in step 1204, permissions manager 1103 will determine if the request is valid by accessing a local permissions database 1113. In some embodiments, a request for validity will be sent to another lock manager 1101. If access is granted (i.e. the request is valid), an unlock request is sent by lock control interface 1110 to relay 1111 to lock or unlock common access entry point 720. If the request is denied the process ends at step 1209. In some embodiments, a permissions aging manager 1104 may modify permissions associated to identifiers based on how long a connection to network 501 has been lost. In other embodiments, a plurality of lock managers 1101 may communicate in a peer-to-peer fashion to share resources to manage overflow or handle special situations (for example, emergency situations. In this regard, overflow manager 1105 may handle overflow requests from other lock managers 1101, and remote processing manager 1106 may handle a plurality of requests from other lock managers 1101.

The skilled person will be aware of a range of possible modifications of the various embodiments described above. Accordingly, the present invention is defined by the claims and their equivalents.

What is claimed is:
1. A cloud-based locking system, comprising:
a network-connected server comprising at least a memory and a processor and further comprising programmable instructions stored in the memory and operating on the processor, the instructions adapted to a system for locking and unlocking a common access entry point comprising:
a lock control interface;
a relay;
a communication manager;
a permissions manager;
a plurality of permissions;
a plurality of permissions categories;
wherein the lock control interface is operably connected to the relay;
wherein the relay is electrically connected to the locking system of the common access entry point and able to lock and unlock a locking device thereon;
wherein the communication manager is configured to receive a request to lock or unlock the locking device from a network;
wherein, the communication manager is operably connected to the lock control interface to issue commands to the lock control interface based on the request;
wherein the permissions manager is configured with a plurality of identifiers, each identifier associated to a mobile device;
wherein said each identifier of the plurality of identifiers is associated to at least a first permission;
wherein each permission of the plurality of permissions is associated to an available function available to the associated mobile device;
wherein the plurality of permissions are configured from the network;
wherein each identifier of the plurality of identifiers is assigned at least a first category.

2. The system of claim 1, wherein each category has a pre-defined set of permissions based on at least a portion of the plurality of permissions.

3. The system of claim 2, further comprising:
a permissions aging manager;
wherein upon a disconnection from the network, the permissions aging manager is executed to keep track of a duration of disconnection from the network.

4. The system of claim 3, further comprising:
a configuration database;
wherein after a preconfigured duration of disconnection, the permissions aging manager modifies at least a portion of the plurality of permissions.

5. The system of claim 4, wherein the at least portion of the plurality of permissions modified is based on at least a portion of the plurality of permissions categories.

6. A cloud-based remote processing locking system, comprising:
a network-connected server comprising at least a memory and a processor and further comprising programmable instructions stored in the memory and operating on the processor, the instructions adapted to a system for locking and unlocking a common access entry point comprising:
a communication manager;
a mobile interface;
a remote processing manager;
a permissions manager;
a permissions database;
wherein a request is received at the communication manager or at the mobile interface or both from at least one other cloud-based remote processing locking system;
wherein the request is forwarded to the network to a cloud access manager;
upon no response from the cloud access manager after a preconfigured duration, forwarding the request to the remote processing manager;
wherein the remote processing manager manages the request;
wherein the remote processing manager determines permissions for the request at the permissions manager based on one or more records in the permissions database.

7. A cloud-based locking method, comprising:
a network-connected server comprising at least a memory and a processor and further comprising programmable instructions stored in the memory and operating on the processor, the instructions adapted to a system for locking and unlocking a common access entry point comprising the steps of:
receive, at a communication manager, a request to lock or unlock a locking device wherein the request is associated to an identifier;
determining, from the network, if the request is valid;
upon no response from the network after a preconfigured duration, determining, by the communications manager, if the request is valid, from a permissions manager based on one or more records in the permissions database;
if the request is valid, sending a lock or an unlock request to the lock control interface;
accessing, at the lock control interface, a relay operably connected to the locking system of the common access entry point;
wherein the communication manager is configured to receive the lock and unlock requests from the cloud;
wherein the communication manager is configured to receive the lock and unlock requests from a short-range wireless interconnected device;
wherein the lock control manager is configured to accept an alphanumeric code to trigger the lock or unlock event;
wherein the communication manager is configured to receive the lock and unlock requests from a radio frequency transmission;
wherein the communication manager is configured to receive the lock or unlock requests from a near field communication device;
wherein the identifier is associated to a mobile device;
wherein the permissions manager accesses a permissions database for one or more permissions.

* * * * *